(12) United States Patent
Lee et al.

(10) Patent No.: US 12,495,482 B2
(45) Date of Patent: Dec. 9, 2025

(54) REINFORCING BOARD AND DISPLAY APPARATUS HAVING THE SAME

(71) Applicant: SAMSUNG DISPLAY CO., LTD., Yongin-si (KR)

(72) Inventors: Sangduk Lee, Yongin-si (KR); Wonjin Kim, Yongin-si (KR); Sunok Oh, Yongin-si (KR); Sangchul Byun, Yongin-si (KR); Sooyeon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 418 days.

(21) Appl. No.: 18/056,504

(22) Filed: Nov. 17, 2022

(65) Prior Publication Data

US 2023/0239992 A1 Jul. 27, 2023

(30) Foreign Application Priority Data

Jan. 25, 2022 (KR) .................. 10-2022-0011044

(51) Int. Cl.
*H05K 1/02* (2006.01)
*G06F 1/16* (2006.01)

(52) U.S. Cl.
CPC ............ *H05K 1/02* (2013.01); *G06F 1/1652* (2013.01)

(58) Field of Classification Search
CPC .. G06F 1/00–1/3296; H05K 5/00–5/30; H10K 50/00–50/88; H10K 77/00–77/111; B32B 3/10–3/22; B32B 15/00–15/02; B32B 15/18–15/20; F28F 3/02–3/14

See application file for complete search history.

(56) References Cited

U.S. PATENT DOCUMENTS

| | | | |
|---|---|---|---|
| 3,763,583 A | 10/1973 | Gregg | |
| 11,248,228 B2 | 2/2022 | Kim et al. | |
| 2015/0049428 A1* | 2/2015 | Lee | G06F 1/1652 |
| | | | 361/679.27 |
| 2018/0175310 A1 | 6/2018 | Lee et al. | |
| 2018/0356859 A1* | 12/2018 | Hamburgen | G06F 1/1626 |
| 2019/0196544 A1* | 6/2019 | Mizoguchi | G06F 1/1652 |
| 2021/0143363 A1 | 5/2021 | Park | |

FOREIGN PATENT DOCUMENTS

| | | |
|---|---|---|
| KR | 10-2018-0042515 | 4/2018 |
| KR | 10-2019-0081335 | 7/2019 |
| KR | 10-2019-0124844 | 11/2019 |
| KR | 10-2021-0028463 | 3/2021 |

\* cited by examiner

*Primary Examiner* — Prashant J Khatri
(74) *Attorney, Agent, or Firm* — F. CHAU & ASSOCIATES, LLC

(57) ABSTRACT

A reinforcing board includes a reinforcing layer that includes a central portion that is thinner than an edge portion, and a plurality of reinforcement members disposed on the central portion. A height of a reinforcement member disposed in a center of the central portion is greater than a height of a reinforcement member disposed in an outer side of the central portion.

21 Claims, 10 Drawing Sheets

REINFORCING BOARD AND DISPLAY APPARATUS HAVING THE SAME

CROSS-REFERENCE TO RELATED APPLICATION

This application claims priority under 35 U.S.C. § 119 from Korean Patent Application No. 10-2022-0011044, filed on Jan. 25, 2022 in the Korean Intellectual Property Office, the contents of which are herein incorporated by reference in their entirety.

TECHNICAL FIELD

One or more embodiments are directed to a reinforcing board and a display apparatus having the same.

DISCUSSION OF THE RELATED ART

Display apparatuses visually display data. Display apparatuses are used in small products such as mobile phones or large products such as televisions.

As the use of display apparatuses has diversified, a variety of designs for improving the quality and functionality of the display apparatuses have been attempted. For example, flexible display layers, such as foldable display layers, rollable display layers, etc., have been developed.

SUMMARY

One or more embodiments provide a reinforcing board in which a height of a centermost reinforcement member of a reinforcing layer of a foldable display can be increased to prevent creasing of a pressure sensitive adhesive (PSA), a film, etc., and a display apparatus including the reinforcing board.

According to one or more embodiments, a reinforcing board includes a reinforcing layer that includes a central portion that has a thickness that is less than a thickness of an edge portion, and a plurality of reinforcement members disposed on the central portion. A reinforcement member disposed in a center of the central portion has a height greater than a height of a reinforcement member disposed in an outer side of the central portion.

A height of each of the plurality of reinforcement members may decrease in a direction away from the center of the central portion.

A height of each of the plurality of reinforcement members may decrease linearly.

A height of the reinforcement member in the center of the central portion may be greater than a height of the reinforcing layer.

The central portion of the reinforcing layer may include stripe patterns, and the stripe patterns may include a plurality of openings and a plurality of blocking portions bonded to the reinforcement members, where each opening may be an empty space and the plurality of openings and the plurality of blocking portions may be alternately arranged.

The reinforcement members may include a material that differs from a material of the reinforcing layer.

The melting point of the reinforcement members may be less than a melting point of the reinforcing layer.

The reinforcement members may be arranged on the central portion at equal intervals from each other.

Heights of reinforcement members may be symmetric with respect to the center of the central portion.

According to one or more embodiments, a display apparatus includes a reinforcing board that includes a reinforcing layer that includes a central portion whose thickness is less than a thickness of an edge portion, and a plurality of reinforcement members disposed on the central portion, and a display layer disposed on the reinforcing board. A height of a reinforcement member disposed in a center of the central portion is greater than a height of a reinforcement member disposed in an outer side of the central portion.

A height of each of the plurality of reinforcement members may decrease in a direction away from the center.

A height of each of the plurality of reinforcement members may decrease linearly.

A height of the reinforcement member disposed in the center of the central portion may be greater than a height of the reinforcing layer.

The central portion of the reinforcing layer may include stripe patterns, and the stripe patterns may include a plurality of openings and a plurality of blocking portions bonded to the reinforcement members, where each opening may be an empty space, and the plurality of openings and the plurality of blocking portions may be alternately arranged.

The melting point of the reinforcement members may be less than a melting point of the reinforcing layer.

The reinforcement members may be arranged on the central portion at equal intervals from each other.

Heights of the reinforcement members may be symmetric with respect to the center of the central portion.

According to one or more embodiments, a reinforcing board includes a reinforcing layer that includes an edge portion and a central portion that includes a stripe pattern; and a substrate disposed on lower portions of the stripe patterns and a portion of a lower surface of the reinforcing layer. The stripe pattern includes a plurality of openings that are alternately arranged with a plurality of blocking portions bonded to a plurality of reinforcement members. A lower portion of the stripe patterns and a portion of the lower surface of the reinforcing layer are disposed on an upper surface of the lower substrate, and a reinforcement member disposed in a center of the central portion has a height greater than a height of a reinforcement member disposed in an outer side of the central portion.

DETAILED DESCRIPTION

Figure 1:
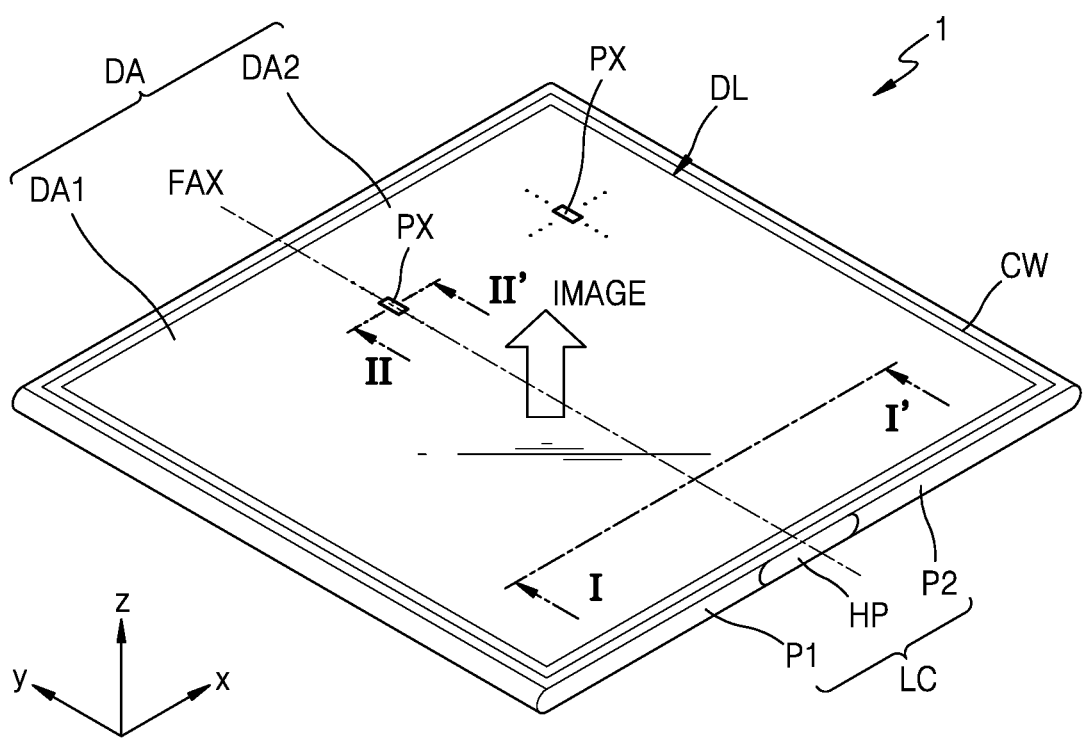
FIGS. 1 and 2 are perspective views of a display apparatus according to an embodiment.

Reference will now be made in detail to embodiments, examples of which are illustrated in the accompanying drawings, wherein like reference numerals may refer to like elements throughout.

Hereinafter, embodiments of the present disclosure will be described with reference to the drawings.

Figure 2:
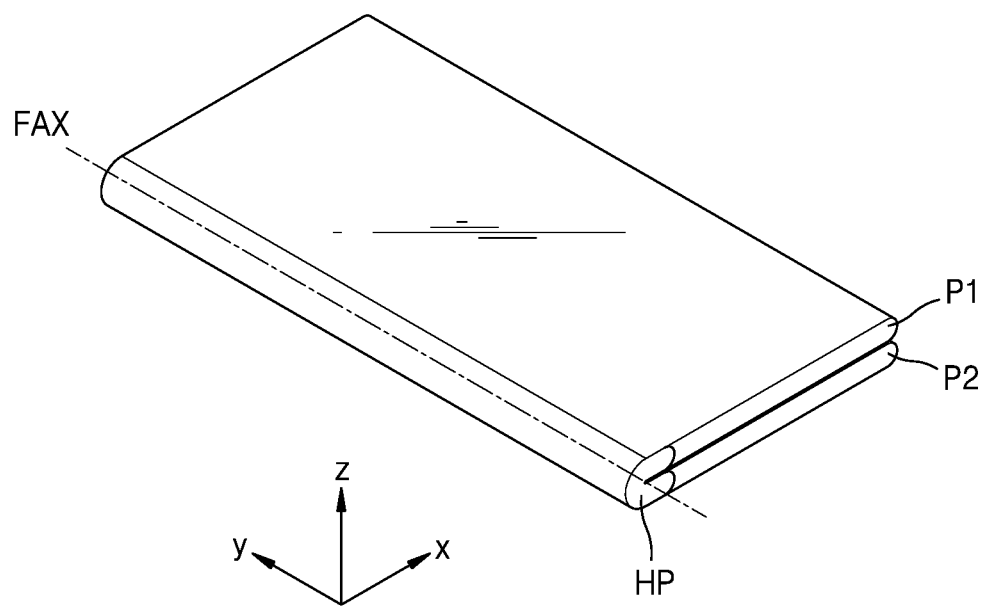

FIGS. 1 and 2 are perspective views of a display apparatus according to an embodiment. FIG. 1 illustrates a state in which a display apparatus 1 is unfolded, and FIG. 2 illustrates a state in which the display apparatus 1 is folded.

Referring to FIGS. 1 and 2, in an embodiment, the display apparatus 1 includes a lower cover LC, a display layer DL, and a cover window CW.

The lower cover LC includes a first portion P1 and a second portion P2 that support the display layer DL. The lower cover LC can be folded based on a folding axis FAX between the first portion P1 and the second portion P2. In an embodiment, the lower cover LC further includes a hinge portion HP, and the hinge portion HP is provided between the first portion P1 and the second portion P2.

The display layer DL includes a display area DA. The display layer DL provides an image through an array of a plurality of pixels PX arranged in the display area DA. Each of the plurality of pixels PX includes a light-emitting area in which light is emitted by a light-emitting element electrically connected to a pixel circuit. In an embodiment, each of the pixels PX emits one of red light, green light, or blue light. Alternatively, each pixel PX emits one of red light, green light, blue light, or white light.

The light-emitting element of the display layer DL includes at least one of an organic light-emitting diode, an inorganic light-emitting diode, a micro light-emitting diode, or a quantum dot light-emitting diode. Hereinafter, for convenience of description, an embodiment where the light-emitting element of the display layer DL includes an organic light-emitting diode will be described. However, contents to be described below are not necessarily limited thereto and can also be applied to an embodiment where the light-emitting element of the display layer DL includes another type of light-emitting element.

The display area DA includes a first display area DA1 and a second display area DA2 arranged at both sides of the display area DA based on the folding axis FAX that crosses the display area DA. Each of the first display area DA1 and the second display area DA2 are respectively located on the first portion P1 and the second portion P2 of the lower cover LC. The display layer DL provides a first image and a second image using light emitted from the plurality of pixels PX arranged in the first display area DA1 and the second display area DA2. In an embodiment, the first image and the second image are portions of one image provided through the display area DA of the display layer DL. In another embodiment, the display layer DL provides a first image and a second image that are independent of each other.

The display layer DL can be folded about the folding axis FAX. When the display layer DL is folded, the first display area DA1 and the second display area DA2 of the display layer DL face each other.

FIGS. 1 and 2 illustrate a case where the folding axis FAX extends in a y-direction. However, embodiments are not necessarily limited thereto. In an embodiment, the folding axis FAX extends in an x-direction that crosses the y-direction. Alternatively, in an embodiment, on a xy-plane, the folding axis FAX extends in a direction that crosses both the x-direction and the y-direction.

In addition, FIGS. 1 and 2 illustrate an embodiment where one folding axis FAX is provided. However, embodiments are not necessarily limited thereto. In an embodiment, the display layer DL can be folded a plurality of times based on a plurality of folding axes FAX that cross the display area DA.

The cover window CW is disposed on the display layer DL and covers the display layer DL. The cover window CW can be folded or bent due to an external force without the occurrence of cracks. When the display layer DL is folded about the folding axis FAX, the cover window CW is also folded.

Figure 3:
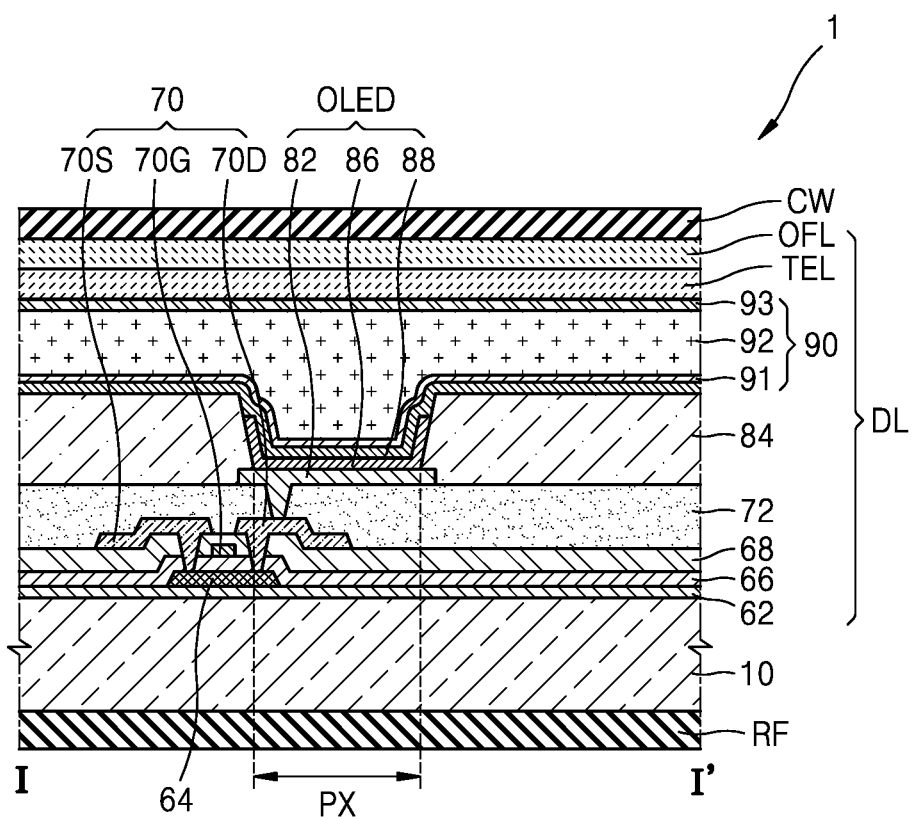
FIG. 3 is a cross-sectional view of a display apparatus according to an embodiment.

FIG. 3 is a cross-sectional view of the display apparatus 1 according to an embodiment. FIG. 3 corresponds to a cross-sectional view of the display apparatus 1 taken along a line I-I' of FIG. 1.

The display layer DL is, for example, one of an organic light-emitting diode (OLED), a liquid crystal display (LCD), or an electrophoretic display (EPD). However, embodiments are not necessarily limited thereto. Hereinafter, an embodiment where the display layer DL is an organic light-emitting display apparatus will be described.

Referring to FIG. 3, in an embodiment, the display layer DL includes a pixel electrode 82 disposed on a first substrate 10, a pixel defining layer 84 disposed on a portion of the pixel electrode 82 and that includes an opening that exposes at least a portion of the pixel electrode 82, an intermediate layer 86 disposed on the pixel electrode 82 and that includes an organic light-emitting layer, and an opposite electrode 88 disposed on the intermediate layer 86.

A reinforcing board RF is disposed on a lower surface of the first substrate 10. The reinforcing board RF supports the display apparatus 1 from the first substrate 10 through the display layer DL to the cover window CW. The reinforcing board RF includes a reinforcement member and a reinforcing layer to be described below. The reinforcing board RF can prevent creasing in a foldable area of the display layer DL due to repeated folding. This will be described in detail below with reference to FIG. 4.

A buffer layer 62 that includes an inorganic material, such as silicon oxide, silicon nitride and/or silicon oxynitride, is disposed on the first substrate 10. The buffer layer 62 increases smoothness of an upper surface of the first substrate 10 and can prevent or minimize impurities from penetrating from the first substrate 10 into an active layer 64 of a thin film transistor 70. In an embodiment, the buffer layer 62 is omitted.

A thin film transistor 70 is disposed on the first substrate 10. The thin film transistor 70 is electrically connected to the pixel electrode 82. The thin film transistor 70 includes an active layer 64 that includes a semiconductor material, such as amorphous silicon, polycrystalline silicon, an oxide semiconductor, or an organic semiconductor material, a gate electrode 70G insulated from the active layer 64, and a source electrode 70S and a drain electrode 70D electrically connected to the active layer 64, respectively. The gate electrode 70G is disposed on and overlaps the active layer 64. The source electrode 70S and the drain electrode 70D are electrically connected to each other in response to a signal applied to the gate electrode 70G. The gate electrode 70G may have a single layer or a multi-layer structure that includes one or more materials, such as aluminum (Al), platinum (Pt), palladium (Pd), silver (Ag), magnesium (Mg), Gold (Au), nickel (Ni), neodymium (Nd), iridium (Ir), chromium (Cr), lithium (Li), calcium (Ca), molybdenum (Mo), titanium (Ti), tungsten (W), or copper (Cu), depending on adhesion with an adjacent layer, surface flatness of a layer being laminated, and processibility.

To insulate the active layer 64 and the gate electrode 70G, a first insulating layer 66 that includes an inorganic material, such as silicon oxide, silicon nitride and/or silicon oxynitride, is disposed on the buffer layer 62 and between the active layer 64 and the gate electrode 70G. Furthermore, a second insulating layer 68 that includes an inorganic material, such as silicon oxide, silicon nitride and/or silicon oxynitride, is disposed on the first insulating layer 66 and the gate electrode 70G, and the source electrode 70S and the drain electrode 70D are disposed on the second insulating layer 68. The source electrode 70S and the drain electrode 70D are electrically connected to the active layer 64 through respective contact holes that penetrate the second insulating layer 68 and the first insulating layer 66.

A third insulating layer 72 that covers the thin film transistor 70 is disposed on the second insulating layer 68. The third insulating layer 72 has a flat upper surface so that the pixel electrode 82 is formed flat. The third insulating layer 72 includes an organic material, such as benzocyclobutene (BCB), polyimide, hexamethyldisiloxane (HMDSO), etc. FIG. 3 shows the third insulating layer 72 as having a single layer structure. However, embodiments are not necessarily limited thereto, and in an embodiment, the third insulating layer 72 has a multi-layered structure.

The third insulating layer 72 includes a via hole that exposes one of the source electrode 70S or the drain electrode 70D of the thin film transistor 70, and the pixel electrode 82 is in contact with one of the source electrode 70S or the drain electrode 70D through a via hole and is electrically connected to the thin film transistor 70. FIG. 3 shows the pixel electrode 82 as being connected to the drain electrode 70D.

An organic light-emitting layer (OLED) that includes the pixel electrode 82, the intermediate layer 86, and the opposite electrode 88 is disposed on the third insulating layer 72.

The pixel electrode 82 is a reflective electrode. When the pixel electrode 82 is a reflective electrode, the pixel electrode 82 includes a reflective layer formed of at least one of Ag, Mg, Al, Pt, Pd, Au, Ni, Nd, Ir, Cr, or a compound thereof, and a transparent conductive layer disposed on and/or under the reflective layer. The transparent conductive layer includes at least one of indium tin oxide (ITO), indium zinc oxide (IZO), zinc oxide (ZnO), indium oxide ($In_2O_3$), indium gallium oxide (IGO), or Al-doped ZnO (AZO). However, embodiments are not necessarily limited thereto, and in other embodiments, the pixel electrode 82 is formed of various other materials, and various modifications to the structure of the pixel electrode 82, such as a single layer or multi-layered structure, are possible.

The pixel defining layer 84 covers an edge region of the pixel electrode 82 and is disposed on the third insulating layer 72. The pixel defining layer 84 includes an opening that exposes at least a portion of the pixel electrode 82, and defines a pixel. The pixel defining layer 84 includes an organic material such as polyimide (PI) or HMDSO. The pixel defining layer 84 may have a single layer or a multi-layered structure.

The intermediate layer 86 is disposed on the portion of the pixel electrode 82 exposed by the pixel defining layer 84. The intermediate layer 86 includes a functional layer such as an emission layer (EML) and further includes functional layers such as a hole injection layer (HIL), a hole transport layer (HTL), an EML, an electron transport layer (ETL), and/or an electron injection layer (EIL).

However, the structure of the intermediate layer 86 is not necessarily limited thereto, and the intermediate layer 86 has various structures in other embodiments. For example, in embodiments, the intermediate layer 86 may include a layer integrally formed over the plurality of pixel electrodes 82 and may also include a layer patterned to correspond to each of the plurality of pixel electrodes 82.

The opposite electrode 88 is disposed on the intermediate layer 86. The opposite electrode 88 is integrally formed over a plurality of pixels, unlike in the pixel electrode 82.

The opposite electrode 88 is a (semi-) transparent electrode. When the opposite electrode 88 is a (semi-) transparent electrode, the opposite electrode 88 includes one or more of Ag, Al, Mg, Li, Ca, Cu, lithium fluoride/calcium (LiF/Ca), LiF/Al, a magnesium-silver alloy (MgAg), or a calcium-silver alloy (CaAg), and may be a thin film having a thickness of several to several tens of nm. The configuration and material of the opposite electrode 88 are not necessarily limited thereto, and various modifications are possible in other embodiments.

A thin film encapsulation layer 90 is disposed on the opposite electrode 88. The thin film encapsulation layer 90 encapsulates the OLED so that the OLED is not exposed to external air or foreign substances, and is very thin and thus may be used as an encapsulation unit for a flexible display apparatus that is bendable or foldable.

The thin film encapsulation layer 90 includes a first inorganic film 91, an organic film 92, and a second inorganic film 93 that are sequentially stacked on the opposite electrode 110. The first inorganic film 91 includes silicon oxide, silicon nitride and/or silicon oxynitride. Because the structure under the first inorganic film 91 is not flat, an upper surface of the first inorganic film 91 is not flat, as shown in FIG. 3. The organic film 92 covers the first inorganic film 91 and has a flat upper surface thereof. The organic film 92 includes one or more of polyethylene terephthalate, polyethylene naphthalate, polycarbonate, polyimide, polyethylene sulfonate, polyoxymethylene, polyarylate, or hexamethyldisiloxane. The second inorganic film 93 covers the organic film 92 and include silicon oxide, silicon nitride and/or silicon oxynitride. In FIG. 3, for purposes of illustration, the thin film encapsulation layer 90 includes one organic film 92. However, the thin film encapsulation layer 90 is not necessarily limited thereto, and may have a structure in which several organic films and inorganic films are ultimately stacked on each other.

A touch electrode layer TEL that includes touch electrodes is disposed on the thin film encapsulation layer 90, and an optical functional layer OFL is disposed on the touch electrode layer TEL. The touch electrode layer TEL acquires coordinate information of an external input, such as a touch event. The optical functional layer OFL reduces reflectivity of external light incident onto the display apparatus 1, and enhances color purity of light emitted from the display apparatus 1.

In an embodiment, the optical functional layer OFL includes a retarder and/or a polarizer. The retarder may be of a film type or a liquid crystal coating type, and may include a λ/2 retarder and/or a λ/4 retarder. The polarizer may also be of a film type or a liquid crystal coating type. A film type polarizer includes a stretched synthetic resin film, and a liquid crystal coating type polarizer includes liquid crystals arranged in an array. The retarder and the polarizer further include a protective film.

In an embodiment, the optical functional layer OFL include an offset interference structure. The offset interference structure includes a first reflective layer and a second reflective layer that are disposed on different layers. First reflected light and second reflected light reflected from the first reflective layer and the second reflective layer, respectively, may offset-interfere, and thus, the reflectivity of external light is reduced.

An adhesive member is disposed between the touch electrode layer TEL and the optical functional layer OFL. Adhesive members that are known in the art can be used as the adhesive member without limitations. For example, the adhesive member is a pressure sensitive adhesive (PSA).

The cover window CW is disposed on the display layer DL. The cover window CW is adhered to the display layer DL by an adhesive member. The adhesive member is, for example, a PSA.

The cover window CW has high transmissivity so as to transmit light emitted from the display layer DL. In an embodiment, the transmissivity of the cover window CW is 85% or more, and transmittance haze is 2% or less. However, embodiments are not necessarily limited thereto.

Figure 4:
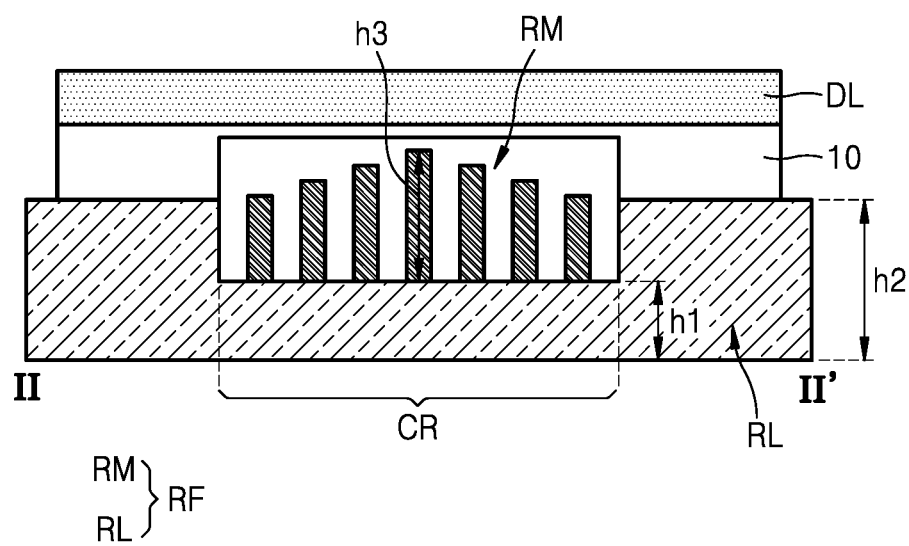
FIG. 4 is a cross-sectional view of a reinforcing board according to an embodiment.

FIG. 4 is a cross-sectional view of a reinforcing board RF according to an embodiment.

Referring to FIG. 4, in an embodiment, the reinforcing board RF includes a reinforcing layer RL and a plurality of reinforcement members RM disposed on a central portion CR of the reinforcing layer RL. A first substrate 10 that covers the plurality of reinforcement members RM is disposed on the reinforcing layer RL. In addition, the display layer DL is disposed on the first substrate 10. The reinforcing board RF supports the display layer DL.

The display layer DL provides an image through an array of a plurality of pixels PX arranged in the display area DA. Each of the plurality of pixels PX defines a light-emitting area in which light is emitted by a light-emitting element electrically connected to a pixel circuit. In an embodiment, each of the pixels PX emits one of red light, green light, or blue light. Alternatively, each pixel PX emits one of red light, green light, blue light, or white light.

The reinforcing layer RL may include the central portion CR that is relatively thin. The edge of the reinforcing layer RL has a second thickness h2, and the central portion CR of the reinforcing layer RL has a first thickness h1. The first thickness h1 is less than the second thickness h2.

In general, a reinforcing layer RL has a stripe pattern instead of the reinforcement member RM disposed in the central portion CR of the reinforcing layer RL to enhance folding performance. The stripe pattern is formed in a cut central portion CR reinforcing layer RL and includes a blocking portion that includes a plurality of rod shapes that are alternately arranged with empty spaces, so that the reinforcing board RF is both rigid and foldable in the foldable area. However, creasing can occur in the central portion CR that has a stripe pattern in the foldable area of the display layer DL due to repeated folding. This will be described in detail with reference to FIGS. 6A through 6C.

In a present embodiment, as shown in FIG. 4, the central portion CR of the reinforcing layer RL is thinner than the other area of the reinforcing layer RL so that the folding performance can be enhanced while simultaneously preventing creasing from occurring. For example, the relatively thin central portion CR is a base metal on which the plurality of reinforcement members RM to be arranged on an upper surface of the central portion CR are melted and bonded, and the central portion CR of the reinforcing layer RL can be smoothly folded in the foldable area due to the central portion CR of the reinforcing layer RL.

A plurality of reinforcement members RMs are arranged on the central portion CR of the reinforcing layer RL at intervals from each other. The plurality of reinforcement members RM have a greatest height at the center thereof. A third thickness h3 is a height of the reinforcement members RM in the center, and the third thickness h3 is greatest of the heights of the plurality of reinforcement members RM. The reinforcement members RM in the center have a greater height than that of the reinforcing layer RL. For example, the centermost reinforcement members RM protrude above a top surface of the thicker part of the reinforcing layer RL. For example, a value obtained by adding the third thickness h3 and the first thickness h1 may be greater than the second thickness h2. When the heights of the plurality of reinforcements RM are the same, a compressive force is applied to the upper surface of the display layer DL due to repeated folding of the display apparatus 1, and a tensile force is applied to the lower surface of the display layer DL, so that deformation occurs in the foldable area, which causes creasing. However, when the height is greatest in the center of the reinforcement members RM, the center of the reinforcement members RM intensively supports the center of the display layer DL to which the greatest compressive force and the greatest tensile force are applied, so that creasing is prevented from occurring.

The first substrate 10 includes various flexible materials, such as a polymer resin such as polyethersulphone (PES), polyacrylate (PAR), polyetherimide (PEI), polyethyelenen napthalate (PEN), polyethyeleneterepthalate (PET), polyphenylene sulfide (PPS), polyarlylate, polyimide (PI), polycarbonate (PC), or cellulose acetate propionate (CAP). The first substrate 10 has a thickness of several to several tens of micrometers (□).

In addition, an adhesive member is disposed between the first substrate 10 and the reinforcing board RF. Adhesive members that are known in the art can be used as the adhesive member without limitations. For example, the adhesive member is a pressure sensitive adhesive (PSA). In addition, a barrier film is disposed between the first substrate 10 and the reinforcing board RF. Barrier films that are known in the art can be used as the barrier film without limitations. For example, the barrier film includes PI.

The first substrate 10 covers the reinforcement members RM and is disposed on the reinforcing layer RL and the reinforcement members RM. The first substrate 10 partially covers the top surface of the reinforcing layer RL. In an embodiment, the first substrate 10 entirely covers the upper surface of the reinforcing layer RL. In an embodiment, the first substrate 10 surrounds at least three surfaces of the reinforcing layer RL. In an embodiment, the first substrate 10 surrounds the upper surface and both side surfaces of the reinforcing layer RL. In an embodiment, the first substrate 10 is in direct contact with the upper surface and both side surfaces of the reinforcing layer RL. In an embodiment, the first substrate 10 is disposed on the central portion CR of the reinforcing layer RL and covers the plurality of reinforcement members RM.

The lower surface of the reinforcing layer RL is not covered by the first substrate 10. For example, the remaining surfaces of the reinforcing layer RL are surrounded by the first substrate 10. The reinforcing layer RL is not completely inserted into the first substrate 10. However, embodiment are not necessarily limited thereto, and in an embodiment, portions of both side surfaces and the upper surface of the reinforcing layer RL, in addition to the lower surface, are not surrounded by the first substrate 10.

The reinforcing layer RL includes a conductive material. The conductive material provides an electro-magnetic interference (EMI) shielding function without the need of a separate EMI shielding film.

The reinforcing layer RL includes a metal. The reinforcing layer RL and the reinforcement members RM are bonded to each other through brazing welding. Brazing is a welding method in which a base metal to be bonded is not substantially melted but rather an inserted metal is melted to form a bonding portion. In the brazing, only the inserted metal is melted by applying a temperature that is higher than the melting point of the inserted metal and lower than the melting point of the base metal. Alternatively, the brazing is performed at a temperature that is less than or equal to the melting point of the base material, which is 450° C. or more. Thus, the reinforcing layer RL has a higher melting point than that of the reinforcement member RM, which is an insertion metal. The melting point of the reinforcement member RM is 450° C. or less, and the reinforcing layer RL has a higher melting point than the reinforcement member RM. For example, only the lower surfaces of the reinforcement members RM to be bonded to the reinforcing layer RL are melted, and the reinforcing layer RL is not melted.

Brazing is suitable for bonding dissimilar metals, such as the reinforcing layer RL and the reinforcement members RM The bonding strength of the reinforcing layer RL and the reinforcement members RM is strong, and the ductility of a bonding surface between the reinforcing layer RL and the reinforcement members RM is increased. After bonding, the reinforcing layer RL is not melted, so that the deformation of the reinforcing layer RL is small and there is no residual stress.

As disclosed above, the reinforcing layer RL includes a metal. The reinforcing layer RL includes at least one of an Al alloy, an Mg alloy, a Fe alloy, Al bronze, Al brass, or portions of a Fe alloy or a Ni alloy that include Al and Ti. However, embodiments are not necessarily limited thereto, and in embodiments, the reinforcing layer RL can, if necessary, include a metal that has a higher melting point than the reinforcement members RM.

The reinforcement members RM include metals that have a lower melting point than the melting point of the reinforcing layer RL. In an embodiment, the reinforcement members RM include metals that have a melting point of 450° C. or less. In an embodiment, the reinforcement members RM include at least one of Ag, Cu, or Zn, and may include one or more of cadmium (Cd), nickel (Ni), tin (Sn), manganese (Mn), or indium (In), etc., if necessary. In an embodiment, the reinforcement members RM includes Al, and includes at least one of Si, Cu, Zn, etc., if necessary. The reinforcement member RM may include stainless steel (SUS).

Figure 5:
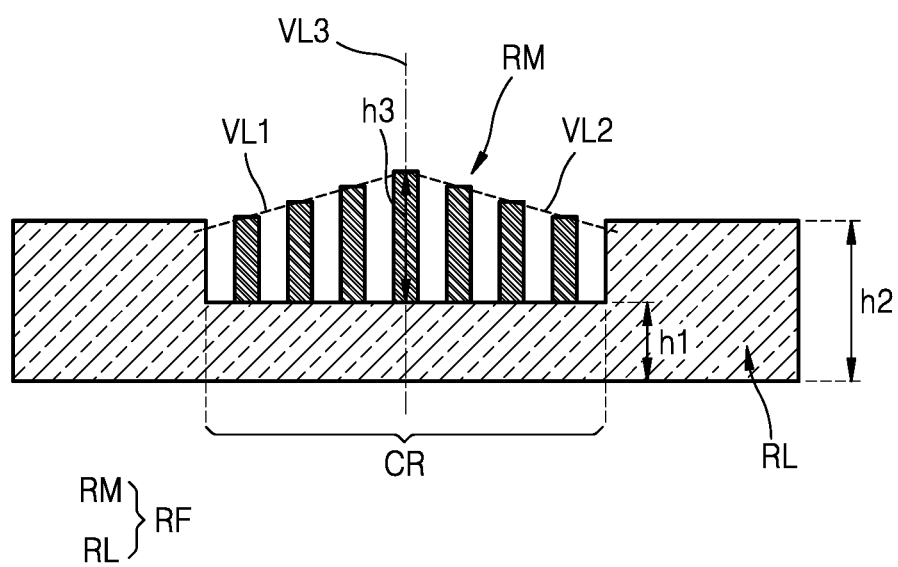
FIG. 5 is a cross-sectional view of a reinforcing board according to an embodiment.

FIG. 5 is a cross-sectional view of a reinforcing board RF according to an embodiment. In FIG. 5, the same reference numerals as those of FIG. 4 may represent the same elements, and thus, a repeated description thereof may be omitted.

Referring to FIG. 5, in an embodiment, as in FIG. 4, a plurality of reinforcement members RM are arranged on the central portion CR of the reinforcing layer RL. The reinforcing layer RL includes the thinner central portion CR. The reinforcing layer RL has a second thickness h2, and the thinner central portion CR of the reinforcing layer RL has a first thickness h1. The first thickness h1 is less than the second thickness h2.

A first virtual line VL1 connects midpoints of upper surfaces of half of the reinforcement member RM arranged on one side of a center of the plurality of reinforcement members RM. A second virtual line VL2 connects midpoints of upper surfaces of half of the reinforcement member RM arranged on an opposite side of the center of the plurality of reinforcement members RM. A third virtual line VL3 that is perpendicular to the upper surfaces of the plurality of reinforcement members RM extends along a center of the central portion CR that divides the plurality of reinforcement members RM.

The first virtual line VL1 and the second virtual line VL2 are straight lines. This means that the plurality of reinforcement members RM that support the display layer DL are highest in the center and lowest in the outer sides. The height of the reinforcement members RM decreases in a direction away from the center by an amount that is linearly proportional to a distance from the center. When the display apparatus 1 is folded, a compressive force and a tensile force applied to the display layer DL are reduced in a direction away from the center. When the compressive force and the tensile force are reduced, the degree of deformation thereof is also reduced. Therefore, because the deformation degree of the display layer DL is reduced in a direction away from the center, creasing of the display layer DL that occurs in a direction away the outer sides is gradually alleviated.

Figure 8:
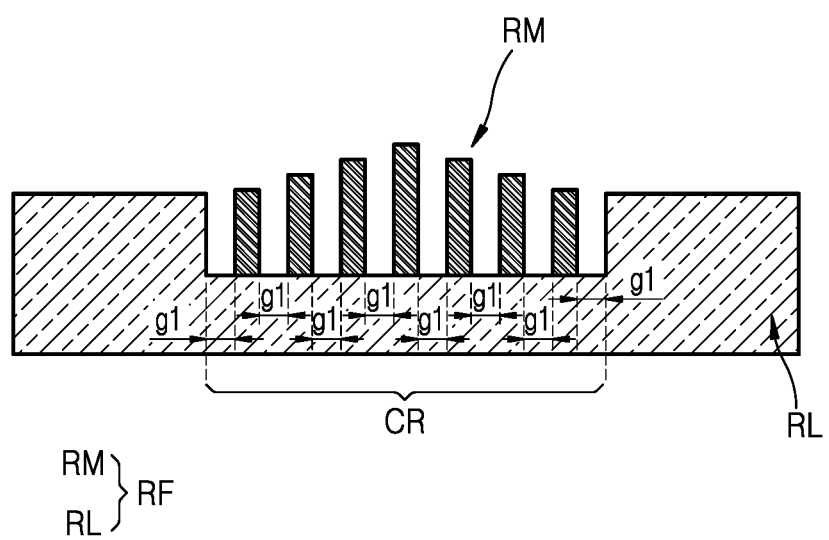
FIG. 8 is a cross-sectional view of a reinforcing board according to an embodiment.

The first virtual line VL1 and the second virtual line VL2 are symmetric with each other about the third virtual line VL3. Those reinforcement members RM that have the same height are symmetrically about the center of the central portion CR, and the plurality of reinforcement members RM are separated on the central portion CR of the reinforcing layer RL at equal intervals, as shown in FIG. 8. When the plurality of reinforcement members RM are arranged at equal intervals, creasing of the display layer DL due to repeated folding is prevented from occurring. The plurality of reinforcement members RM are arranged at equal intervals with the greatest height in the center and constantly support the display layer DL from the center to the outer sides so that creasing is alleviated.

The plurality of reinforcement members RM not only have equal intervals, but also have a height that decreases from the center to the outer side. Through the plurality of reinforcement members RM having heights that decrease linearly, the effect of preventing creasing of the display layer DL due to repeated folding is further increased.

Figure 6A:
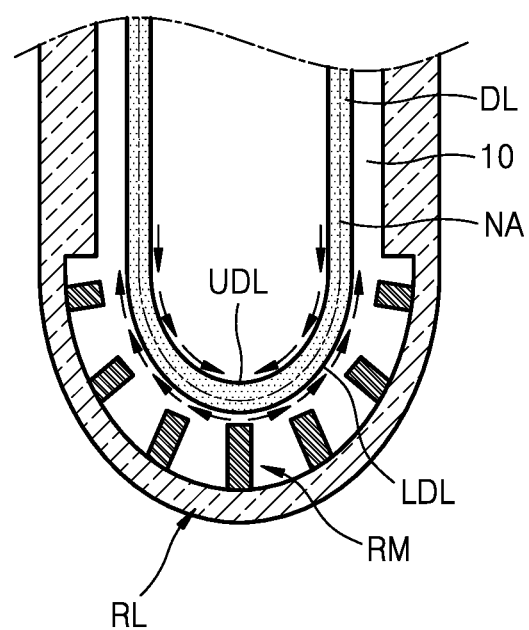
FIGS. 6A through 6C illustrate surface creasing.
Figure 6B:
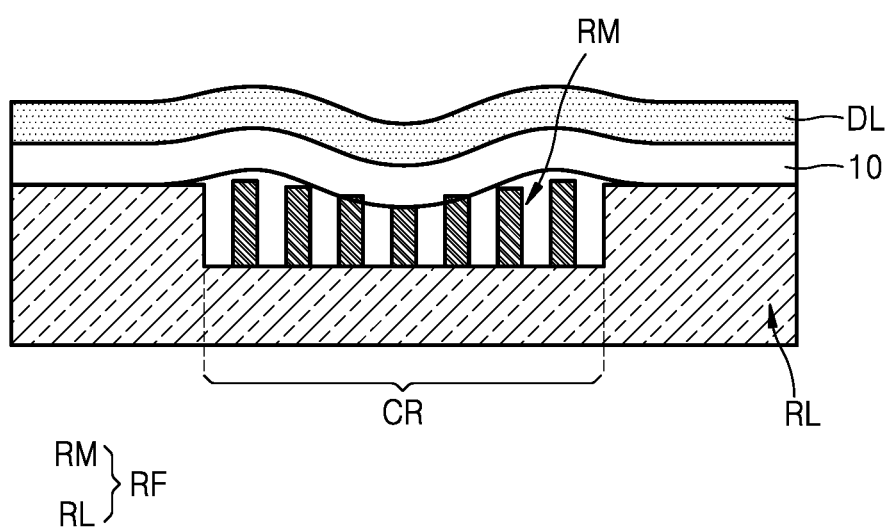
Figure 6C:
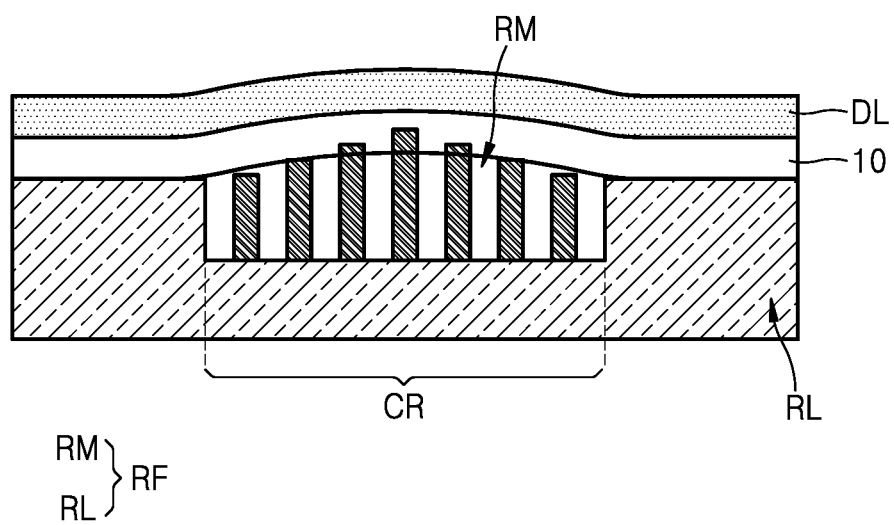

FIGS. 6A through 6C are cross-sectional views of surface creasing.

FIG. 6A illustrates a case where the display apparatus 1 is folded.

Referring to FIG. 6A, in an embodiment, the first substrate 10 and the display layer DL are folded and bent on the reinforcing layer RL and the plurality of reinforcement members RM. Based on a neutral axis NA of the display layer DL, a compressive force is applied to a display layer upper surface UDL, and a tensile force is applied to a display layer lower surface LDL. The neutral axis NA has a constant length before and after the display layer DL is folded. When folded, based on the neutral axis NA, the length of the display layer upper surface UDL is reduced compared to that of the neural axis NA so that a compressive force is applied to the display layer upper surface UDL. The arrow shown in the lower part of the display layer upper surface UDL represents the compressive force applied. When folded, based on the neutral axis NA, the length of the display layer lower surface LDL is increased compared to that of the neural axis NA so that a tensile force is applied to the display layer lower surface LDL. The arrow shown in the lower part of the display layer lower surface LDL represents the compressive force applied.

FIG. 6B is a cross-sectional view that illustrates an occurrence of creasing of the display layer DL due to repeated folding of the display apparatus 1.

Referring to FIG. 6B, in an embodiment, a height of a plurality of reinforcement members RM arranged on the central portion CR of the reinforcing layer RL is lowered ifor those reinforcement members RM away from the outer side. Creasing occurs in the center of the first substrate 10 and the display layer DL due to the compressive force and the tensile force applied to the first substrate 10 and the display layer DL due to the repeated folding. The compressive force and the tensile force cause plastic deformation of the first substrate 10 and the display layer DL so that creasing occurs in the foldable area of the surface of the display apparatus 1.

In addition, even when the plurality of reinforcement members RM have the same height, creasing occur in the foldable area of the surface of the display apparatus 1, as described above. This is because, as shown in FIG. 6A, most deformation of the display layer DL occurs in the center of the display layer DL, when the plurality of reinforcement members RM have the same height.

FIG. 6C illustrates deformation of the display layer DL due to repeated folding of the display apparatus 1 when the plurality of reinforcement members RM in the center have the greatest height.

Referring to FIG. 6C, in an embodiment, the central reinforcement member RM of the plurality of reinforcement members RM has the greatest height. Even when a compressive force and a tensile force are applied to the display layer DL due to repeated folding, creasing is prevented from occurring in the center of the display layer DL. Deformation may occur in the display layer DL so that the center of the display layer DL may crease. The plurality of reinforcement members RM in the center that have the greatest height intensively support the center of the display layer DL so that creasing is prevented from occurring. Thus, even when folding is repeated, creasing is prevented from occurring in the foldable area of the surface of the display apparatus 1. FIG. 6C illustrates a shape where the center of the display layer DL rises to show how the reinforcement member RM support the display layer DL.

Figure 7:
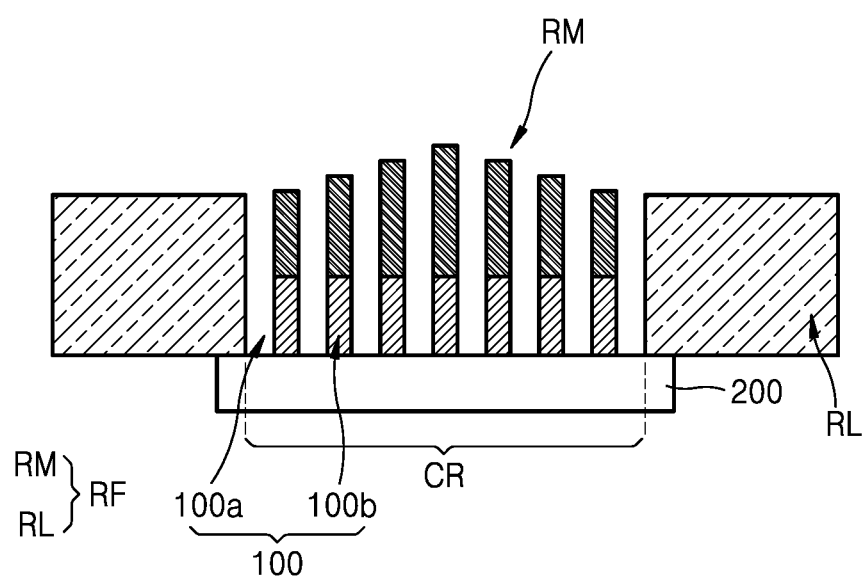
FIG. 7 is a cross-sectional view of a reinforcing board according to an embodiment.

FIG. 7 is a cross-sectional view of a reinforcing board according to an embodiment. In FIG. 7, the same reference numerals as those of FIG. 4 may represent the same elements, and thus, a repeated description thereof may be omitted.

Referring to FIG. 7, in an embodiment, a central portion CR of the reinforcing layer RL includes stripe patterns 100. The stripe patterns 100 include a plurality of openings 100a, which are empty spaces, that are alternately arranged with a plurality of blocking portions 100b bonded to the plurality of reinforcement members RM. A lower substrate 200 is disposed on lower portions of the stripe patterns 100 and a portion of the lower surface of the reinforcing layer RL.

When the stripe patterns 100 are arranged in the central portion CR of the reinforcing layer RL, the folding performance of the display apparatus 1 is enhanced. Because the reinforcing layer RL is rigid and includes a metal, when the reinforcing layer RL is thick, folding is not smoothly performed. However, the stripe patterns 100 include openings 100a and blocking portions 100b that are alternately arranged. Thus, even when the stripe patterns 100 have the same height, folding can be relatively smoothly performed. During folding, the density of the openings 100a is reduced in the foldable area of the reinforcing board RF so that folding performance is enhanced. The number of the plurality of blocking portions 100b is the same as the number of the plurality of reinforcement members RM. The blocking portions 100b have the same length and an upper surface of the blocking portions 100b has the same area as the lower surface of the reinforcement members RM. Thus, the blocking portions 100b are bonded to the reinforcement members RM.

The stripe patterns 100 are arranged in the central portion CR of the reinforcing layer RL, and the plurality of reinforcement members RM are bonded to upper surfaces of the plurality of blocking portions 100b. The plurality of reinforcement members RM are bonded to the plurality of blocking portions 100b through brazing welding. Brazing is a welding method in which a base metal to be bonded is not substantially melted but rather an inserted metal is melted to form a bonding portion. In brazing, the insertion metal is melted by applying a temperature that is higher than the melting point of the insertion metal and lower than the melting point of the base metal. Alternatively, brazing is performed at a temperature that is less than or equal to the melting point of the base material, which is 450° C. or more. Thus, the blocking portions 100b, which are base metals, have a higher melting point than the reinforcement member RM, which is an insertion metal. The melting point of the reinforcement member RM is 450° C. or less, and the blocking portions 100b has a higher melting point than the reinforcement member RM. For example, only the lower surfaces of the reinforcement members RM that are bonded to upper surfaces of the plurality of blocking portions 100b are melted, and the blocking portions 100b are not melted.

Brazing is suitable for bonding dissimilar metals, such as the blocking portions 100b and the reinforcement members RM The bonding strength of the blocking portions 100b and the reinforcement members RM is strong, and the ductility of a bonding surface between the blocking portions 100b and the reinforcement members RM is increased. After bonding, the blocking portions 100b are not melted so that the deformation of the blocking portions 100b is small and there is no residual stress.

The blocking portions 100b include metal. The blocking portions 100b include at least one of a non-ferrous alloy except for an Al alloy, an Mg alloy, a Fe alloy, a light metal. Al bronze, Al brass, or a portion of a Fe or Ni alloy that includes Al and Ti. However, embodiments are not necessarily limited thereto, and in embodiments, if necessary, the blocking portions 100b include metals that have a higher melting point than that of the reinforcement member RM.

The reinforcement members RM include metals that have a lower melting point than the blocking portions 100b. In an embodiment, the reinforcement members RM include metals that have a melting point of 450° C. or less. The reinforcement members RM include at least one of Ag, Cu, or Zn, and may include, if necessary, at least one of cadmium (Cd), nickel (Ni), tin (Sn), manganese (Mn), or indium (In), etc. In an embodiment, the reinforcement members RM include Al, and may, if necessary, include one or more of Si, Cu, or Zn, etc.

A plurality of reinforcement members RM are arranged on the plurality of blocking portions 100b. The plurality of reinforcement members RM have the greatest height in the center thereof. When the heights of the plurality of reinforcement members RM are the same, a compressive force is applied to the upper surface of the display layer DL due to repeated folding applied to the display apparatus 1, and a tensile force is applied to the bottom surface of the display layer DL, so that deformation occurs in the folded area, which causes creasing. However, when the height of the centermost reinforcement members RM is greatest, the centermost reinforcement members RM can intensively support the center of the display layer DL to which the greatest compressive forces and greatest tensile forces are applied, so that creasing is prevented from occurring.

The lower substrate 200 is disposed on the lower portion of the stripe patterns 100 and a portion of the lower surface of the reinforcing layer RL so that the lower portion of the stripe patterns 100 and a portion of the lower surface of the reinforcing layer RL are disposed on an upper surface of the lower substrate 200. The stripe patterns 100 include the empty spaces of the plurality of openings 100a so that the plurality of blocking portions 100b are not connected. As a result, the plurality of openings 100a and the plurality of reinforcement members RM arranged in the central portion CR of the reinforcing layer RL crease to the bottom due to the absence of members connected to both sides thereof. The lower substrate 200 is disposed on portions of the plurality of blocking portions 100b of the stripe pattern 100 and the lower surface of the reinforcing layer RL so that the plurality of openings 100a and the plurality of reinforcement members RM are prevented from creasing to the bottom.

FIG. 8 is a cross-sectional view of a reinforcing board RF according to an embodiment. In FIG. 8, the same reference numerals as those of FIG. 4 may represent the same elements, and thus, a repeated description thereof may be omitted.

Referring to FIG. 8, in an embodiment, the plurality of reinforcement members RM are arranged on the central portion CR of the reinforcing layer RL at equal intervals of a first gap g1. When the plurality of reinforcement members RM are arranged at equal intervals of the first gap g1, creasing of the display layer DL due to repeated folding is prevented from occurring. The plurality of reinforcement members RM are arranged at equal intervals of the first gap g1 with the highest member in the center, and constantly support the display layer DL from the center to the outer side so that creasing is alleviated.

As described above, in a reinforcing board and a display apparatus that includes the same according to one or more embodiments, the height of the centermost reinforcement members is greatest so that creasing of a surface is prevented from occurring. However, the scope of embodiments of the present disclosure is not necessarily limited by these effects.

It should be understood that embodiments described herein should be considered in a descriptive sense only and not for purposes of limitation. Descriptions of features within each embodiment should typically be considered as available for other similar features in other embodiments. While one or more embodiments have been described with reference to the figures, it will be understood by those of ordinary skill in the art that various changes in form and details may be made therein without departing from the spirit and scope as defined by the following claims.

What is claimed is:

1. A reinforcing board, comprising:
a reinforcing layer that includes a central portion that has a thickness that is less than a thickness of an edge portion, wherein the central portion includes an inner portion in a center of the central portion and outer portions on either side of the inner portion and between the inner portion and the edge portion of the reinforcing layer; and
a plurality of reinforcement members disposed on the central portion,
wherein a reinforcement member disposed in the inner portion has a height greater than a height of a reinforcement member disposed in the outer portions, and
when the reinforcing layer is folded, the reinforcement members face inward from the folded part.

2. The reinforcing board of claim 1, wherein a height of each of the plurality of reinforcement members decreases in a direction away from the center of the central portion.

3. The reinforcing board of claim 2, wherein a height of each of the plurality of reinforcement members decreases linearly.

4. The reinforcing board of claim 1, wherein a height of the reinforcement member in the center of the central portion is greater than a height of the reinforcing layer.

5. The reinforcing board of claim 1, wherein
the central portion of the reinforcing layer comprises stripe patterns, and
the stripe patterns comprise a plurality of openings and a plurality of blocking portions bonded to the reinforcement members, wherein each opening is an empty space, and
the openings and the blocking portions are alternately arranged.

6. A reinforcing board, comprising:
a reinforcing layer that includes a central portion that has a thickness that is less than a thickness of an edge portion, wherein the central portion includes an inner portion in a center of the central portion and outer portions on either side of the inner portion and between the inner portion and the edge portion of the reinforcing layer; and
a plurality of reinforcement members disposed on the central portion,
wherein a reinforcement member disposed in the inner portion has a height greater than a height of a reinforcement member disposed in the outer portions
wherein the reinforcement members include a material that differs from a material of the reinforcing layer.

7. The reinforcing board of claim 6, wherein the reinforcement members have a lower melting point than the reinforcing layer.

8. The reinforcing board of claim 1, wherein the reinforcement members are arranged on the central portion at equal intervals from each other.

9. The reinforcing board of claim 1, wherein heights of the reinforcement members are symmetric with respect to the center of the central portion.

10. The reinforcing board of claim 1, wherein a melting point of the reinforcement members is less than a melting point of the reinforcing layer.

11. A display apparatus, comprising:
a reinforcing board that includes a reinforcing layer that includes a central portion whose thickness is less than a thickness of an edge portion, and a plurality of reinforcement members disposed on the central portion, wherein the central portion includes an inner portion in a center of the central portion and outer portions on either side of the inner portion and between the inner portion and the edge portion of the reinforcing layer; and
a display layer disposed on the reinforcing board,
wherein a height of a reinforcement member disposed in the inner portion is greater than a height of a reinforcement member disposed in the outer portions, and
when the display apparatus is folded, the reinforcement members face inward from the folded part.

12. The display apparatus of claim 11, wherein a height of each of the plurality of reinforcement members decreases in a direction away from the center of the central portion.

13. The display apparatus of claim 12, wherein a height of each of the plurality of reinforcement members decreases linearly.

14. The display apparatus of claim 11, wherein a height of the reinforcement member disposed in the center of the central portion is greater than a height of the reinforcing layer.

15. The display apparatus of claim 11, wherein the central portion of the reinforcing layer comprises stripe patterns, and the stripe patterns comprise a plurality of openings and a plurality of blocking portions bonded to the reinforcement members, wherein each opening is an empty space, and the openings and the blocking portions are alternately arranged.

16. The display apparatus of claim 11, wherein the reinforcement members comprise a material that differs from a material of the reinforcing layer.

17. The display apparatus of claim 16, wherein the reinforcement members have a lower melting point than the reinforcing layer.

18. The display apparatus of claim 11, wherein the reinforcement members are arranged on the central portion at equal intervals from one another.

19. The display apparatus of claim 11, wherein heights of the reinforcement members are symmetric with respect to the center of the central portion.

20. The display apparatus of claim 11, wherein a melting point of the reinforcement members is less than a melting point of the reinforcing layer.

21. A reinforcing board, comprising:

a reinforcing layer that includes an edge portion and a central portion that includes a stripe pattern, wherein the central portion includes an inner portion in a center of the central portion and outer portions on either side of the inner portion and between the inner portion and the edge portion of the reinforcing layer; and a substrate disposed on lower portions of the stripe patterns and a portion of a lower surface of the reinforcing layer, wherein the stripe pattern includes a plurality of openings that are alternately arranged with a plurality of blocking portions bonded to a plurality of reinforcement members, wherein a lower portion of the stripe patterns and a portion of the lower surface of the reinforcing layer are disposed on an upper surface of a lower substrate, and wherein a reinforcement member disposed in the inner portion has a height greater than a height of a reinforcement member disposed in the outer portions.

* * * * *